Sept. 20, 1949.　　　　　L. G. TUBBS　　　　　2,482,522
VOLTAGE REGULATING SYSTEM
Filed May 7, 1946
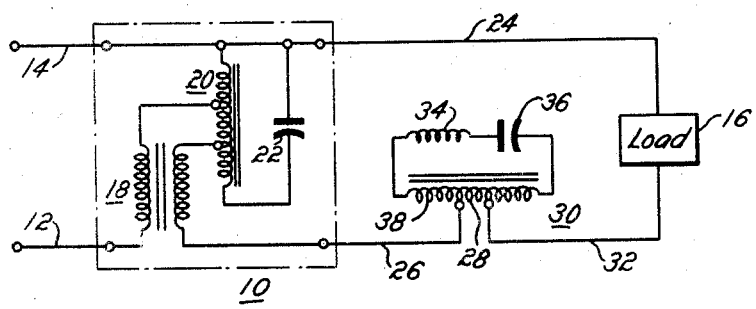
WITNESSES:
Wm. B. Sellers.
Leon J. Laza
INVENTOR
Lester G. Tubbs.
BY
James N. Ely
ATTORNEY Patented Sept. 20, 1949

2,482,522

UNITED STATES PATENT OFFICE 2,482,522

VOLTAGE REGULATING SYSTEM

Lester G. Tubbs, Pittsburgh, Pa., assignor to Westinghouse Electric Corporation, East Pittsburgh, Pa., a corporation of Pennsylvania Application May 7, 1946, Serial No. 667,755

2 Claims. (Cl. 323—61)

This invention relates to regulating systems and in particular to regulating systems having a stabilizing network.

Heretofore, the output of different static type regulators has been corrected for voltage drop due to an inductive load by employing a capacitor connected in series circuit in the output circuit, the capacitor being so dimensioned that its capacity reactance will compensate for the inductive reactance of the regulator. Correction for error in the output voltage caused by frequency variation has also been obtained by the use of a tuned reactor and capacitor connected in series directly in the output circuit, such correction being in proportion to the inductive portion of the load.

With the known systems the drop across the compensating or stabilizing elements is too great for economic operation, and it has been impossible to obtain simultaneous compensation for both frequency error and the drop due to the inductive load where both types of error occur simultaneously.

An object of this invention is to provide in a regulating system having a static regulator for supplying an inductive load, for a stabilizing network disposed for economic operation to simultaneously compensate for frequency changes and for voltage drop in the regulator due to the inductive load.

Other objects of this invention will become apparent from the following description taken in conjunction with the accompanying drawing, the single figure of which is a diagrammatic view of circuits and apparatus illustrating a regulating system embodying the stabilizing network in accordance with this invention.

Referring to the single figure of drawing, this invention is illustrated by reference to the regulating system comprising the static regulator 10 supplied by conductors 12 and 14 from a source (not shown) to supply an inductive load 16. There are many different types of static regulators available on the open market, and this invention is therefore not to be limited to the use of any particular type of static regulator. The regulator 10 illustrated in the drawing is of well known construction, being sold at the present time on the open market and being shown for purposes of illustration only.

The static regulator 10 illustrated comprises a two-winding reactor 18 connected in circuit with a part of the winding of a single winding reactor 20 provided with a highly saturated core, a capacitor 22 being connected in series circuit with the winding of reactor 20. With this construction, as the supply voltage varies, the exciting current of the reactor 20 varies greatly to vary the voltage drop in the reactor 18 to compensate for line voltage changes, the capacitor 22 functioning to supply a portion of the exciting current of reactor 20 whereby a lower current change therein produces a higher percentage change in the reactor 18.

One of the output terminals of the regulator 10 is connected by conductor 24 to one side of the load 16, the other output terminal of the regulator 10 being connected by conductor 26 to a terminal of the primary winding 28 of an autotransformer 30, the other terminal of the primary winding being connected by conductor 32 to the other side of the inductive load 16. The primary winding 28 of the transformer 30 is thus connected directly in series circuit relation between the regulator 10 and the inductive load 16.

As illustrated, a reactor 34 and a capacitor 36 are connected in series circuit relation with each other and are disposed to be supplied by the secondary winding 38 of the transformer 30. The reactor 34 and the capacitor 36 are carefully selected so that as supplied through the transformer 30 simultaneous compensation will be obtained for frequency error and for any change in the reactance of the regulator 10 occasioned by reason of the inductive load supplied.

Thus, the capacitor 36 in series circuit with the reactor 34 is so selected or dimensioned that at the normal frequency for the system, the capacitor reactance is more than that necessary for cooperating with the inductive reactance of reactor 34 to balance therewith and compensate for frequency changes from the normal. The excessive capacitor reactance over that needed for frequency compensation is utilized to compensate for the inductive reactance of the regulator 10 due to the inductive load supply.

Since the reactor 34 and the capacitor 36 are connected in series circuit relation with each other, the voltage drops across these elements are in opposition. It is therefore apparent that the transformer 30 is quite small, being only of sufficient size to produce enough energy to supply the difference in the voltage drops across the series connected reactor and capacitor A small step-up autotransformer is satisfactory for transmitting the required corrective volts.

The network utilized in the system referred to hereinbefore is especially adapted for use in low voltage circuits, such as output circuits of the neighborhood of 110-120 volts where very little energy can be spared in effecting compensation.

The elements utilized to effect the simultaneous compensation described are all of standard design, and as a minimum of apparatus is required, it is appreciated that the system is economical in obtaining the efficient simultaneous compensation for frequency errors and voltage drop of the regulator due to inductive load.

I claim as my invention:

1. In a regulating system having a static voltage regulator disposed to supply an inductive load, the combination comprising, a transformer having its primary winding connected in series circuit relation between the regulator and the load, and a reactor and a capacitor connected in series circuit relation disposed to be supplied by the transformer whereby the voltage drops across the reactor and capacitor are in opposition, the transformer being of sufficient size to produce only enough energy to supply the difference in the voltage drops across the series connected reactor and capacitor, the reactor and capacitor being selected to cooperate to compensate for frequency changes with the capacitor being of sufficient capacity to also compensate for the inductive reactance of the regulator due to the inductive load supplied.

2. In a regulating system having a static voltage regulator disposed to supply an inductive load, the combination comprising, an autotransformer having a primary winding and a secondary winding, the primary winding of the transformer being connected in series circuit relation between the regulator and the load, and a reactor and a capacitor connected in series circuit relation across the secondary winding of the transformer, the capacitor having a capacity reactance sufficient to cooperate with the reactance of the reactor to compensate for changes in line frequency while simultaneously therewith also compensating for the inductive reactance of the static regulator due to the inductive load supplied.

LESTER G. TUBBS.

REFERENCES CITED

The following references are of record in the file of this patent:

UNITED STATES PATENTS

| Number | Name | Date |
| --- | --- | --- |
| 2,179,353 | Schmutz | Nov. 7, 1939 |
| 2,197,254 | Hunter | Apr. 16, 1940 |
| 2,221,456 | Pohm | Nov. 12, 1940 |
| 2,246,177 | Levoy | June 17, 1941 |
| 2,367,625 | Short | Jan. 16, 1945 |